UNITED STATES PATENT OFFICE.

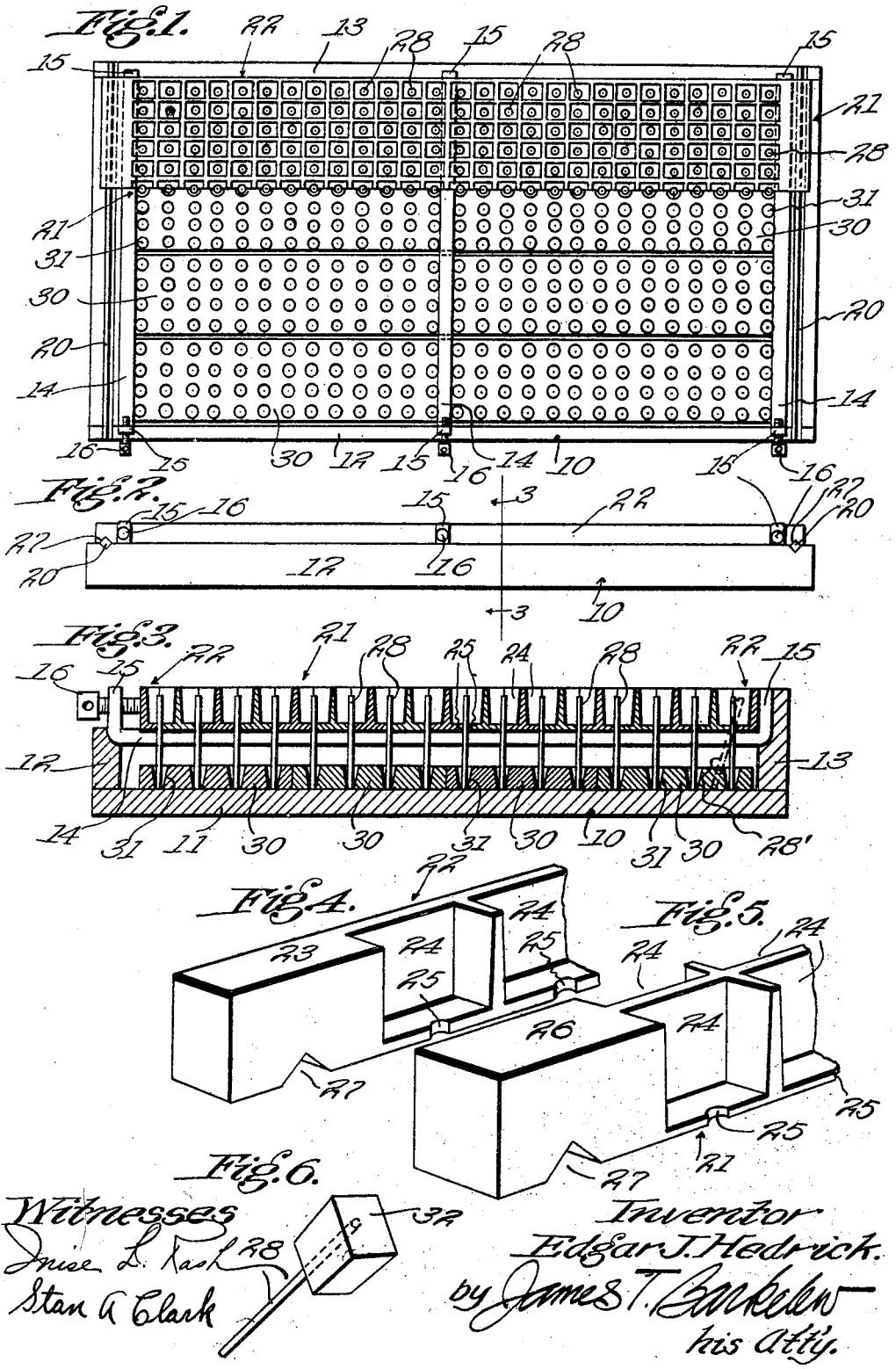

EDGAR J. HEDRICK, OF LOS ANGELES, CALIFORNIA.

CANDY-MOLD.

934,310.  Specification of Letters Patent.  Patented Sept. 14, 1909.

Application filed March 23, 1909. Serial No. 485,228.

*To all whom it may concern:*

Be it known that I, EDGAR J. HEDRICK, a citizen of the United States, residing at Los Angeles, in the county of Los Angeles and State of California, have invented new and useful Improvements in Candy-Molds, of which the following is a specification.

Heretofore candy products of this class, known as suckers, have been made by hand. The sucker consists of a stick with a small body of candy on its end, the stick being provided so that the candy may be held without the fingers coming into direct contact with the same. The operation of manufacture has consisted of molding the body of the candy around the end of the stick with the fingers, the candy being worked and handled continuously during the operation. This results in an uninviting and dirty looking sucker both as to general configuration, the hand worked sucker being usually formless, and as to general appearance of the surface.

The object of the present invention is to provide a device which will produce suckers quickly and in a perfectly sanitary condition. With the present device the candy portion of the suckers is not touched by the hand at all during the operation of manufacture. The product is possessed of a regular form and has a sanitary and attractive appearance.

In the accompanying drawings:—Figure 1 is a plan view of the machine partially set for operation. Fig. 2 is a front elevation of the same fully set. Fig. 3 is an enlarged cross section taken on lines 3—3 of Fig. 2. Figs. 4 and 5 are perspective detail views of the mold members. Fig. 6 is a small perspective view showing the finished product.

The machine consists essentially of a box base 10 having a bottom 11 and front and back walls 12 and 13. Across the top of the box there are placed flat bars 14 which turn up on each end at 15 and are provided with tightening screws 16 in their forward upturned ends. Bars 14 rest upon front and back pieces 13 and are held at some distance above the bottom of the box as is shown in Fig. 3. Lying across bars 14, and supported upon rods 20 across the ends of the box structure, is a plurality of mold members 21 and 22. Members 22, the two outermost ones, are comprised of a bar 23 having recesses 24 reaching from its top and one side so as to form one half of a complete mold. In the edge of the bottom wall of this half mold there is cut a semicircular notch 25. Members 21 are similar to members 22 with the exception that they are double, having the half mold recesses on both sides of the bar 26 of which they are formed. All of the mold members are provided with a V-shaped groove 27 on their lower edges near each end for engagement with square rods 20. When the members are placed in position on rods 20 the half mold recesses are brought into register with each other as is shown in Fig. 1, the semicircular notches 25 also registering to form a complete circular opening in the center of the bottom of the complete mold. This opening is of such a size that it is neatly filled by the sticks 28 of the finished sucker. In the bottom of the box there is arranged a plurality of stick spacing boards 30, these boards extending along the length of the box and being slightly movable transversely thereof. The aggregate width of the spacing boards is less than the inside width of the box so that there is sufficient room remaining for the adjustment of the boards.

The device is built up in the following manner. The spacing boards are all pulled toward the left in Fig. 3 so that the sticks will lie in the position indicated by dotted lines at 28', spacing holes 31 being of an inverted cone shape so as to allow the sticks to assume such a position. The end mold member is then placed in position as shown in Fig. 1. Sticks 28 are then placed in holes 31 beneath member 22, there being a hole 31 in the spacing boards beneath each circular opening formed by the registration of semi-circular notches 25 in the bottom of the half molds. A complete row of sticks is placed in this position, leaning against notches 25 in the position indicated by the dotted lines at 28'. One of the mold members 21 is then placed in position against member 22, sticks 28 being thus inclosed within the circular opening in the bottom of the molds. The sticks are then placed in position along the front edge of member 21, this operation being repeated until the whole device has been set up, and the set of molds finished by the placement of a second end mold member 22 on the front end. Spacing boards 30 are then pushed into position as shown in Fig. 3 and screws 16 are tightened up so as to clamp the mold members tightly together, the sticks then standing vertically and projecting up into the molds a suitable distance.

With the molds all placed the candy material is poured over them in a liquid or semi-liquid state. Each of the individual molds is thus filled with the candy which immediately hardens around the upper ends of the sticks. As soon as the candy has hardened sufficiently the whole device is overturned and laid out upon a clean table top. Screws 16 are loosened and the box and other parts of the device are lifted away, leaving the mold members with the candy underneath them and the sticks projecting above. The mold members are loosened by being slightly worked and are lifted off the finished suckers, which are then picked up by the sticks and placed in boxes ready for shipping. The finished article has the appearance depicted in Fig. 6, the body of candy 32 being as nearly rectangular in shape as it is possible to make the molds.

It will be seen that the suckers produced by this device are absolutely sanitary and that they have none of the unattractiveness of those made by hand. The time required is also much less than by hand manufacture, the molds being set while the batch of candy is cooking, practically all the time of hand working being thus saved.

Having described my invention, I claim:—

1. A candy mold, comprising a plurality of spaced separable molds, and a spacing means arranged adjacent the molds and adapted to space the ends of sticks whose other ends project into the molds.

2. A candy mold, comprising a box base, a plurality of movable spacing boards arranged in the bottom of the box and having spaced apertures therein for the reception of a plurality of vertically extended sticks, a plurality of separable molds arranged above the spacing boards, each of the molds having an aperture in its bottom through which one of the sticks projects into the mold, and means for securing the separable parts of the mold together.

3. A candy mold, comprising two separable halves, the halves parting along a vertical plane and having semicircular notches in their bottom walls, the notches adapted to register and form a complete circular opening in the bottom of the mold, and a means below the mold to support a stick projecting through the circular opening up into the mold.

4. A candy mold, comprising two separable halves having recesses therein of such configuration as to form a complete mold chamber when the halves are assembled, the mold chamber being open on the top, there being notches in the edges of the bottoms of the mold halves, the notches being registrable to form an opening in the bottom of the assembled mold, and means to vertically support a stick projecting through the opening into the mold.

5. A candy mold, comprising a plurality of members having half mold recesses therein, and having notches in their bottom walls, the recesses and notches adapted to register when the members are assembled, and means to space and support the ends of sticks projecting through the notches into the molds.

6. A candy mold, comprising a plurality of members, each having a plurality of half mold recesses spaced therein and notches on the edges of the half mold walls, the notches and recesses adapted to register when the members are assembled, means to clamp the members together, and spacing and supporting means arranged adjacent the assembled molds for spacing and supporting the ends of sticks whose other ends project through the notches into the molds.

In witness that I claim the foregoing I have hereunto subscribed my name this 16th day of March 1909.

E. J. HEDRICK.

Witnesses:
 HARRY HARRIS,
 JAMES T. BARKELEW.